United States Patent
Byon

(10) Patent No.: US 10,851,703 B2
(45) Date of Patent: *Dec. 1, 2020

(54) VARIABLE-FLOW-RATE VALVE MECHANISM AND TURBOCHARGER

(71) Applicant: IHI Corporation, Tokyo (JP)

(72) Inventor: Jinhee Byon, Tokyo (JP)

(73) Assignee: IHI Corporation, Tokyo (JP)

(*) Notice: Subject to any disclaimer, the term of this patent is extended or adjusted under 35 U.S.C. 154(b) by 182 days.

This patent is subject to a terminal disclaimer.

(21) Appl. No.: 16/009,804

(22) Filed: Jun. 15, 2018

(65) Prior Publication Data

US 2018/0291801 A1 Oct. 11, 2018

Related U.S. Application Data

(63) Continuation of application No. 14/743,106, filed on Jun. 18, 2015, now Pat. No. 10,024,229, which is a (Continued)

(30) Foreign Application Priority Data

Apr. 15, 2013 (JP) .................................. 2013-084513

(51) Int. Cl.
  *F02B 37/18* (2006.01)
  *F01D 17/10* (2006.01)
  *F01D 17/14* (2006.01)

(52) U.S. Cl.
  CPC .......... *F02B 37/186* (2013.01); *F01D 17/105* (2013.01); *F01D 17/141* (2013.01);
  (Continued)

(58) Field of Classification Search
  CPC ........... F02B 37/18–186; F01D 17/105; F05D 2260/606; Y02T 10/144
  See application file for complete search history.

(56) References Cited

U.S. PATENT DOCUMENTS 8,109,257 B2 2/2012 An
8,820,709 B2 9/2014 Lombard et al.
(Continued)

FOREIGN PATENT DOCUMENTS

CN 101600868 A 12/2009
DE 10 2011 011 003 A1 8/2012
(Continued)

OTHER PUBLICATIONS

International Search Report issued in PCT/JP2014/056842 dated Apr. 22, 2014 (w/ English Translation).
(Continued)

*Primary Examiner* — Laert Dounis
(74) *Attorney, Agent, or Firm* — Oblon, McClelland, Maier & Neustadt, L.L.P.

(57) ABSTRACT

A clearance δ between an inner peripheral surface of an attachment hole of an attachment tongue and an outer peripheral surface of a valve shaft is set to be smaller than an allowable displacement amount λ in an axial direction of a valve with respect to the attachment tongue. When a condition is satisfied in which the outer peripheral surface of the valve shaft comes into contact with a front-side periphery and a back-side periphery of the attachment hole of the attachment tongue, and in which a top surface of a valve body comes into contact with a back surface of the attachment tongue, a waste gate valve is constituted so that a metal washer becomes non-contact with a front surface of the attachment tongue.

14 Claims, 6 Drawing Sheets

Related U.S. Application Data continuation of application No. PCT/JP2014/056842, filed on Mar. 14, 2014.

(52) U.S. Cl.
CPC ........ *F02B 37/183* (2013.01); *F05D 2220/40* (2013.01); *F05D 2260/606* (2013.01); *Y02T 10/144* (2013.01)

(56) References Cited

U.S. PATENT DOCUMENTS

| | | |
|---|---|---|
| 9,145,827 B2 | 9/2015 | Lueddecke |
| 2012/0312010 A1 | 12/2012 | Yasoshima |
| 2013/0305711 A1 | 11/2013 | Lueddecke |
| 2013/0340239 A1 | 12/2013 | Ueda |

FOREIGN PATENT DOCUMENTS

| | | |
|---|---|---|
| DE | 10 2013 209 864 A1 | 12/2014 |
| EP | 2 508 730 A2 | 10/2012 |
| JP | 56-97530 | 8/1981 |
| JP | 61-33923 | 3/1986 |
| JP | 61-132442 U | 8/1986 |
| JP | H04-272430 A | 9/1992 |
| JP | H07-19065 A | 1/1995 |
| JP | H10-103069 A | 4/1998 |
| JP | 2001-263078 A | 9/2001 |
| JP | 2005-161363 A | 6/2005 |
| JP | 2005-226591 A | 8/2005 |
| JP | 2008-25442 A | 2/2008 |
| JP | 2008-101589 A | 5/2008 |
| JP | 2009-236088 A | 10/2009 |
| JP | 2010-209688 A | 9/2010 |
| JP | 2011-106358 A | 6/2011 |
| JP | 2012-167610 A | 9/2012 |
| JP | 2013-024043 A | 2/2013 |
| WO | 2011/108331 A1 | 9/2011 |
| WO | 2012/107224 A1 | 8/2012 |
| WO | 2014/011468 A1 | 1/2014 |

OTHER PUBLICATIONS

Written Opinion issued in PCT/JP2014/056842 dated Apr. 22, 2014.
Korean Office Action issued in Patent Application No. 10-2015-7018560 dated Mar. 2, 2016.
Combined Office Action and Search Report issued in Chinese Patent Application No. 201480003833.1 dated Dec. 1, 2016 (w/ English translation of category of cited documents).
German Third Party Observations Communication issued in Patent Application No. DE 11 2014 001 968.2 dated Feb. 7, 2018.
Office Action dated Sep. 10, 2019 in German Patent Application No. 11 2014 001 968.2.

VARIABLE-FLOW-RATE VALVE MECHANISM AND TURBOCHARGER

CROSS REFERENCE TO RELATED APPLICATIONS

This application is a continuation of U.S. patent application Ser. No. 14/743,106 filed Jun. 18, 2015, which is a continuation of International Patent Application No. PCT/JP2014/056842 filed on Mar. 14, 2014, which claims priority to Japanese Patent Application No. 2013-084513 filed Apr. 15, 2013, the entire contents of each of which are incorporated by reference herein.

BACKGROUND

1. Technical Field

The present disclosure relates to a variable-flow-rate valve mechanism that opens and closes an opening of a gas-flow-rate variable passage for adjusting a flow rate of exhaust gas supplied to a turbine wheel side in a turbocharger such as a vehicular turbocharger, and a turbocharger including the variable-flow-rate valve mechanism.

2. Description of the Related Art

As measures for preventing an excessive rise in a turbocharging pressure by a vehicular turbocharger (hereinafter, simply referred to as a turbocharger), usually, the turbocharger is provided with a bypass passage and a waste gate valve. The bypass passage is formed inside a turbine housing of the vehicular turbocharger, and bypasses a part of exhaust gas from a turbine wheel (a turbine impeller). The waste gate valve is provided at an appropriate position of the turbine housing, and opens and closes an opening of the bypass passage. Here, the bypass passage is one of gas-flow-rate variable passages that adjust a flow rate of the exhaust gas supplied to the turbine wheel side. The waste gate valve is one of variable-flow-rate valve mechanisms that open and close an opening of the gas-flow-rate variable passage.

A general configuration of the waste gate valve will be explained. A support hole is formed by penetrating through an outer wall of the turbine housing. A stem is rotatably supported by the support hole. A base end (one end) of the stem projects outside the turbine housing. In addition, a link member is provided integrally with the base end of the stem. The link member swings around an axial center of the stem in normal and reverse directions by driving actuator.

As shown in FIG. 1, an attachment member 153 is provided integrally with a tip (the other end) of the stem. An attachment hole 155 is formed by penetrating through the attachment member 153. In addition, a valve 157 is provided fitted in the attachment hole 155 of the attachment member 153. The valve 157 is allowed to have backlash to the attachment member 153 (an inclination to a center line C' of the attachment hole 155 of the attachment member 153 is included). Furthermore, the valve 157 includes: a valve body 161 that can abut against and separate from a valve seat on the opening side of the bypass passage; and a valve shaft 163 provided integrally with a center of the valve body 161, and fitted in the attachment hole 155 of the attachment member 153. Here, backlash of the valve 157 to the attachment member 153 is allowed, and thus followability (adhesion) of the valve 157 (valve body 161) to the valve seat on the opening side of the bypass passage is secured. Furthermore, a clasp 167 for making the valve 157 non-detachable from the attachment member 153 is provided integrally with a tip of the valve shaft 163.

Accordingly, when the turbocharging pressure (a pressure on an exit side of a compressor wheel (a compressor impeller)) reaches a setting pressure during operation of the turbocharger, the link member swings in the normal direction (one direction) by driving the actuator. The stem rotates in the normal direction by the swing of the link member in the normal direction. The valve swings in the normal direction by rotation of the stem in the normal direction, and the valve body 161 separates from the valve seat on the opening side of the bypass passage. As a result, the opening of the bypass passage is opened by a waste gate valve 137, a part of exhaust gas is bypassed from the turbine wheel, and a flow rate of the exhaust gas supplied to the turbine wheel side decreases.

In addition, when the turbocharging pressure becomes less than the setting pressure after the opening of the bypass passage is opened, the link member swings in the reverse direction (the other direction) by driving the actuator. When the stem rotates in the reverse direction by the swing of the link member in the reverse direction, the valve 157 swings in the reverse direction, and the valve body 161 abuts against the valve seat on the opening side of the bypass passage. As a result, the opening of the bypass passage is closed by the waste gate valve 137, and the flow rate of the exhaust gas supplied to the turbine wheel side increases.

Note that Japanese Patent Laid-Open Publication No. 2009-236088 and Japanese Patent Laid-Open Publication No. 2008-101589 show conventional technologies in relation to the present disclosure.

SUMMARY

In order to reduce a chattering sound from a waste gate valve (a contact sound along with vibration of the valve) during operation of the turbocharger, it is necessary to increase not only the weight of the valve but also the weight of a clasp, and suppress the vibration of the valve (vibration of the valve and the clasp) by a pulsating pressure of exhaust gas, or the like.

In contrast, when an outer diameter of the clasp becomes larger due to the increase of weight of the clasp, the following problem arises. FIG. 1 shows a state where the opening of the bypass passage is opened, and where the valve 157 is inclined to the center line C' of the attachment hole 155 of the attachment member 153. As shown in FIG. 1, when the valve 157 inclines, the valve body 161 comes into contact with a back surface 153b of the attachment member 153, and at the same time, the clasp 167 comes into contact with a front surface 153a of the attachment member 153. As a result, a large reaction force acts on the clasp 167 from the attachment member 153. Accordingly, a coupling force (a fastening force) of the tip of the valve shaft 163 and the clasp 167 is reduced along with increase in an accumulated operation time of the turbocharger, and it becomes difficult to enhance durability of the waste gate valve, namely, durability of the turbocharger. Note that round marks of FIG. 1 indicate the above-described contact portions.

That is, there arises a problem in which it is difficult to enhance durability of the turbocharger while reducing the chattering sound from the waste gate valve during operation of the turbocharger.

Note that the above-described problem arises not only in the waste gate valve but also similarly in other variable-flow-rate valve mechanisms used for turbochargers such as a vehicular turbocharger.

Consequently, an object of the present disclosure is to provide a variable-flow-rate valve mechanism and a turbocharger which can solve the above-described problem.

A first aspect of the present disclosure is a variable-flow-rate valve mechanism used for a turbocharger in which a gas-flow-rate variable passage for adjusting a flow rate of exhaust gas supplied to a turbine wheel side has been formed inside a turbine housing or inside a connection body connected in a state of communicating with the turbine housing, and that is configured to open and close an opening of the gas-flow-rate variable passage, the variable-flow-rate valve mechanism comprising: a stem rotatably supported by a support hole formed by penetrating through an outer wall of the turbine housing or the connection body, and having a base end projecting outside the turbine housing or the connection body; a link member provided integrally with the base end of the stem, and configured to swing around an axial center of the stem in normal and reverse directions by driving an actuator; an attachment member provided integrally with the stem, and provided with an attachment hole formed penetrating through the attachment member; a valve including: a valve body fitted in the attachment hole of the attachment member with being allowed to have backlash to the attachment member, and configured to abut against and separate from a valve seat on an opening side of the gas-flow-rate variable passage; and a valve shaft provided integrally with a center of the valve body, and is fitted in the attachment hole of the attachment member; and a clasp provided integrally with a tip of the valve shaft, configured to make the valve non-detachable from the attachment member, wherein a clearance between an inner peripheral surface of the attachment hole of the attachment member and an outer peripheral surface of the valve shaft is set to be smaller than a value obtained by subtracting a depth dimension of the attachment hole of the attachment member from an interval dimension between a top surface of the valve body and a back surface of the clasp, and wherein when a condition is satisfied in which the outer peripheral surface of the valve shaft comes into contact with a front-side periphery and a back-side periphery of the attachment hole of the attachment member, and in which the top surface of the valve body comes into contact with a back surface of the attachment member, the variable-flow-rate valve mechanism is constituted so that the clasp becomes non-contact with a front surface of the attachment member.

Here, the "gas-flow-rate variable passage" means inclusion of a bypass passage for bypassing a part of exhaust gas from the turbine wheel. The "variable-flow-rate valve mechanism" means inclusion of a waste gate valve that opens and closes an opening of the bypass passage. In addition, the "connection body connected in a state of communicating with the turbine housing" means inclusion of a piping, a manifold, a casing, and the like which are connected in a state of communicating with a gas inlet or a gas outlet of the turbine housing. Furthermore, the "backlash to the attachment member" means inclusion of inclination and slight movement to a center line of the attachment hole of the attachment member. Being "provided integrally" means inclusion of being formed integrally. Additionally, the "front-side periphery", the "back-side periphery", the "front surface", and the "back surface" mean portions serving as the front-side periphery, the back-side periphery, the front surface, and the back surface, respectively, when the variable-flow-rate valve mechanism is planarly viewed from the clasp side.

A second aspect of the present disclosure is a turbocharger that turbocharges air supplied to an engine by utilizing energy of exhaust gas from the engine, the turbocharger including the variable-flow-rate valve mechanism according to the first aspect.

According to the present disclosure, since a large reaction force does not act on the clasp from the attachment member in a state where the opening of the gas-flow-rate variable passage is opened even though a weight of the clasp is increased, reduction of a coupling force (a fastening force) of the tip of the valve shaft and the metal washer along with increase in an accumulated operation time of the turbocharger is sufficiently suppressed while reducing a chattering sound from the variable-flow-rate valve mechanism during operation of the turbocharger, and durability of the variable-flow-rate valve mechanism, namely, durability of the turbocharger can be enhanced.

DESCRIPTION OF THE EMBODIMENTS

Figure 1:
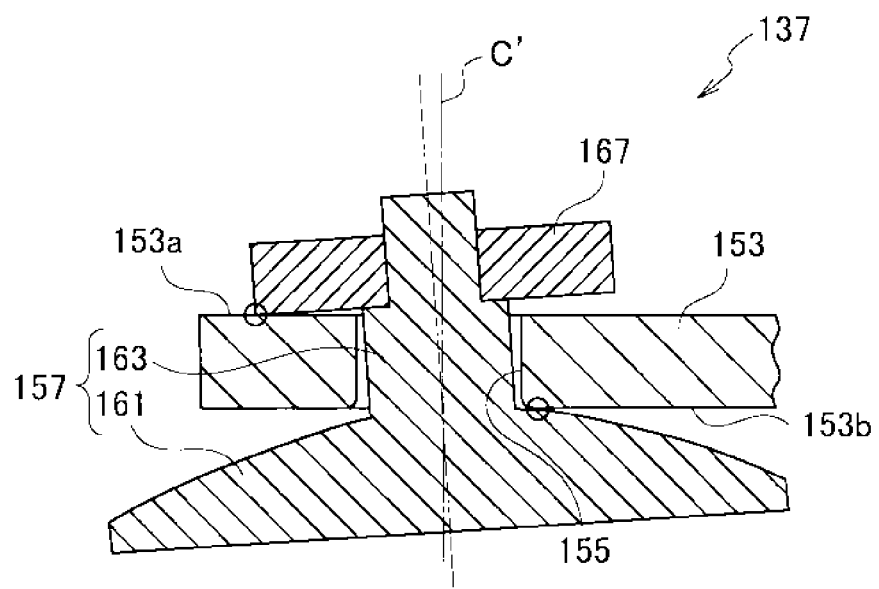
FIG. 1 is a view explaining a problem to be solved by the disclosure.
Figure 2A:
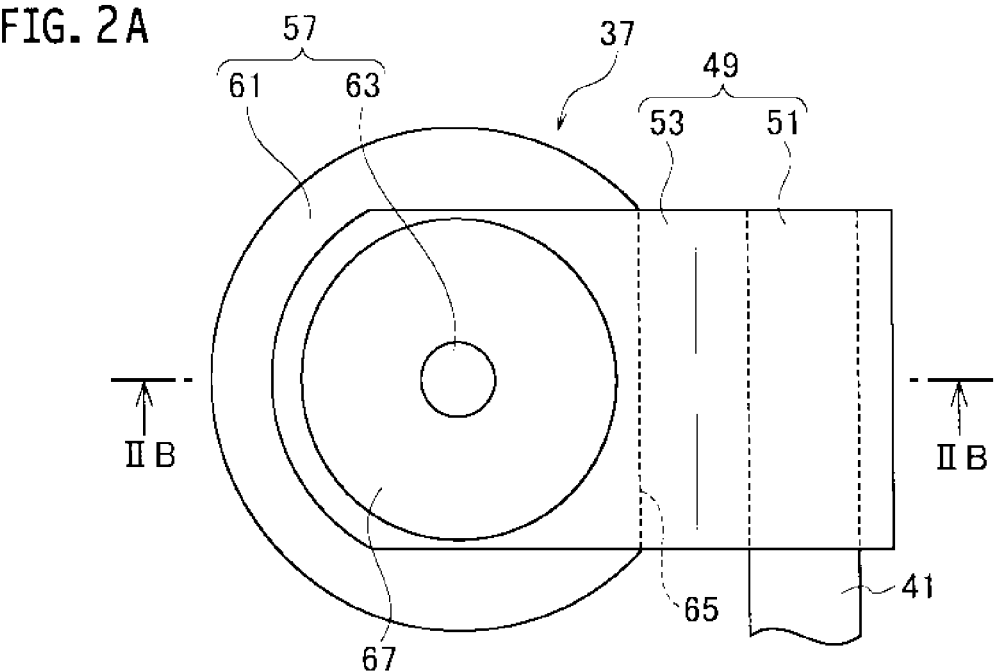
FIG. 2A is a plan view of a waste gate valve according to an embodiment of the present disclosure.
Figure 2B:
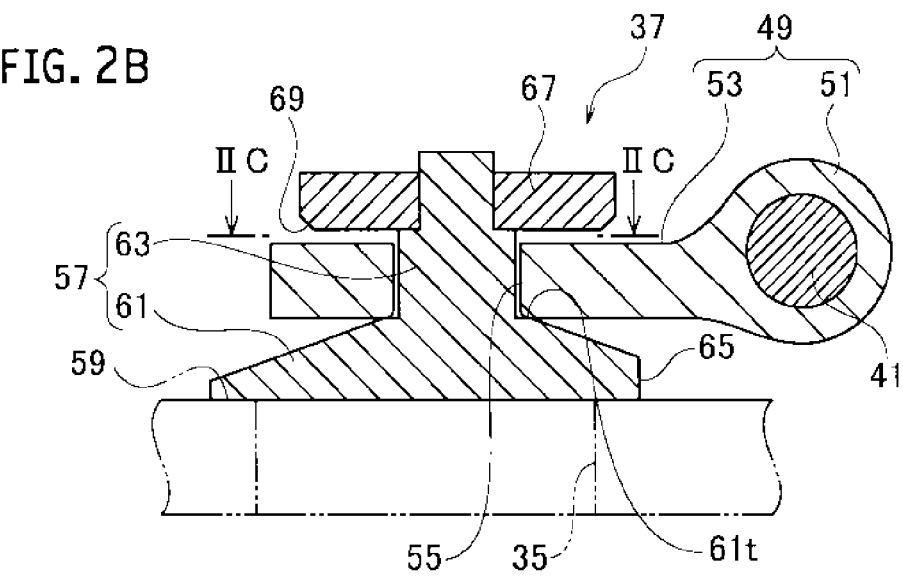
FIG. 2B is a cross-sectional view along a line IIB-IIB in FIG. 2A.
Figure 2C:
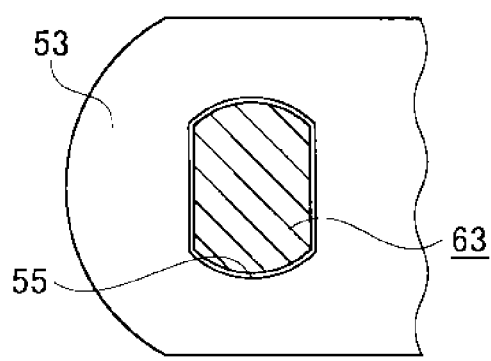
FIG. 2C is a cross-sectional view along a line IIC-IIC in FIG. 2B.

Embodiments of the present disclosure will be explained with reference to FIGS. 2 to 6. Note that a reference character "L" in FIGS. 4 to 6 denotes a left direction, and that a reference character "R" therein denotes a right direction.

Figure 6:
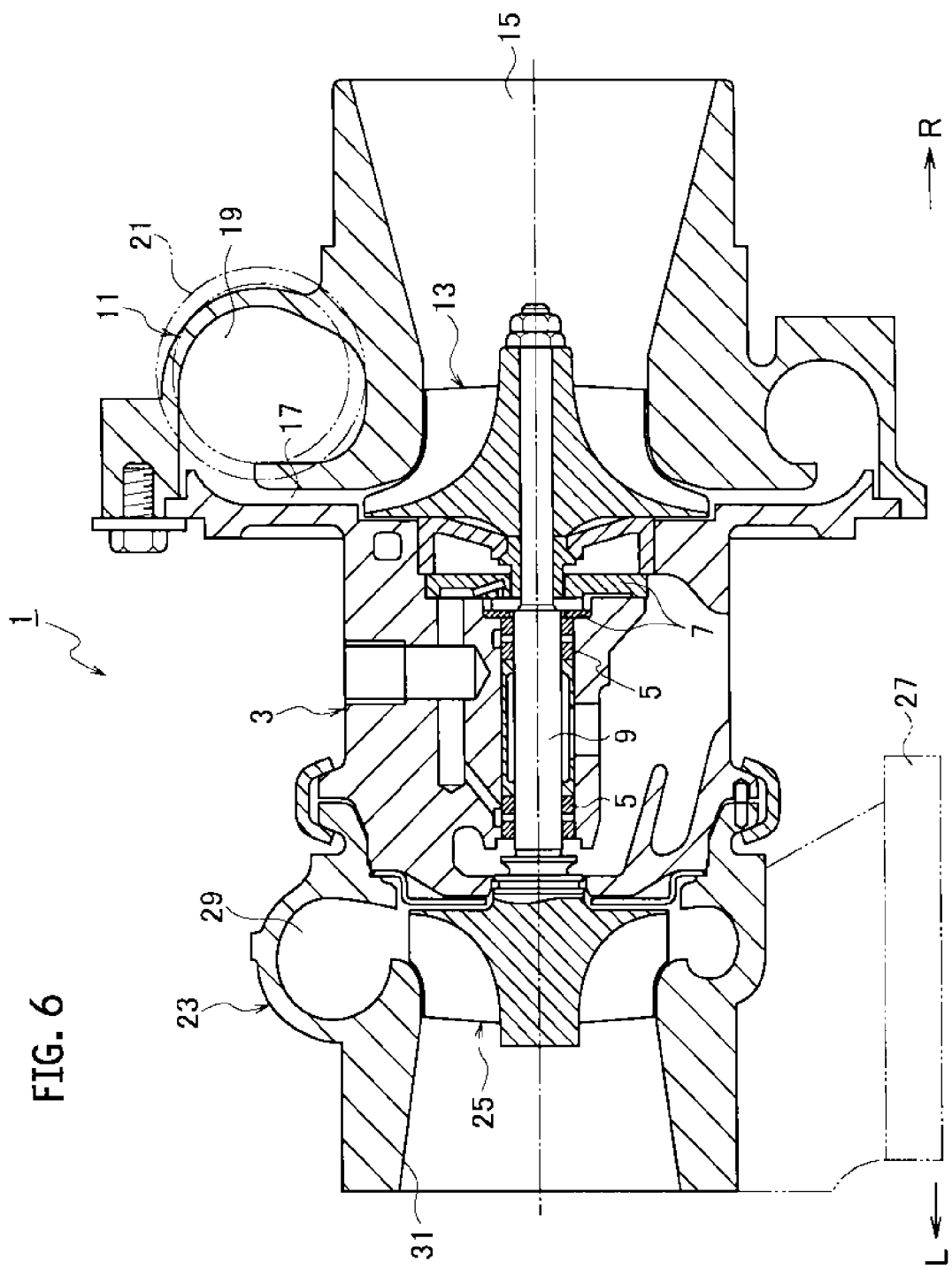
FIG. 6 is a front cross-sectional view of the vehicular turbocharger according to the embodiment of the present disclosure.

As shown in FIG. 6, a vehicular turbocharger (hereinafter, referred to as a turbocharger) 1 according to the embodiment of the present disclosure turbocharges (compresses) air supplied to an engine (illustration is omitted) by utilizing energy of exhaust gas from the engine. Additionally, a specific configuration of the turbocharger 1 is as follows.

The turbocharger 1 includes a bearing housing 3. A pair of radial bearings 5 and a pair of thrust bearings 7 are provided in the bearing housing 3. A rotor shaft (a turbine shaft) 9 extending in a horizontal direction is rotatably provided at the plurality of bearings 5 and 7. In other words, the rotor shaft 9 is rotatably provided in the bearing housing 3 via the plurality of bearings 5 and 7.

A compressor housing 11 is provided on a right side of the bearing housing 3. In addition, a compressor wheel (a compressor impeller) 13 is rotatably provided in the compressor housing 11.

The compressor wheel 13 is coupled concentrically integrally with a right end (one end) of the rotor shaft 9, and compresses the air by utilizing a centrifugal force.

An air introduction port (an air introduction passage) 15 for introducing the air is formed on an entrance side (an upstream side in a flow direction of the air) of the compressor wheel 13 in the compressor housing 11. The air introduction port 15 is connected to an air cleaner (illustration is omitted) that purifies air. In addition, a diffuser flow passage 17 is formed on an exit side (a downstream side in the flow direction of the air) of the compressor wheel 13 between the bearing housing 3 and the compressor housing 11. The diffuser flow passage 17 is formed in an annular shape, and raises a pressure of the compressed air. A compressor scroll flow passage 19 is formed inside the compressor housing 11. The compressor scroll flow passage 19 is formed in a spiral shape so as to surround the compressor wheel 13. The compressor scroll flow passage 19 communicates with the diffuser flow passage 17. An air outlet (an air discharge passage) 21 for discharging the compressed air is formed at an appropriate position of an outer wall of the compressor housing 11. The air outlet 21 communicates with the compressor scroll flow passage 19, and is connected to an air supply manifold (illustration is omitted) of the engine.

A turbine housing 23 is provided on a left side of the bearing housing 3. A turbine wheel (a turbine impeller) 25 is rotatably provided in the turbine housing 23. The turbine wheel 25 is concentrically coupled integrally with a left end (the other end) of the rotor shaft 9, and generates a rotation force (rotation torque) by utilizing pressure energy of the exhaust gas.

Figure 4:
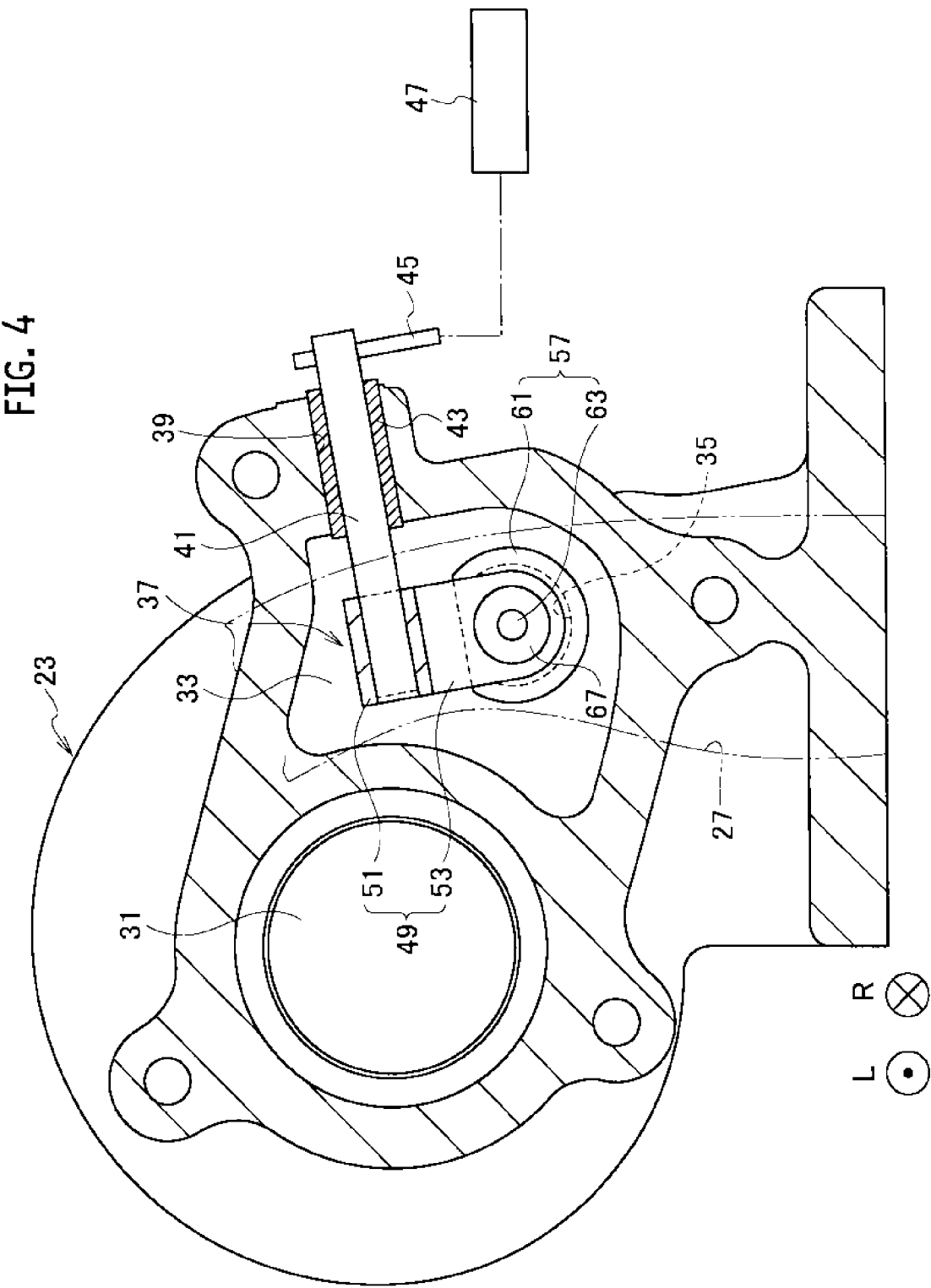
FIG. 4 is a cross-sectional view along a line IV-IV in FIG. 5.
Figure 5:
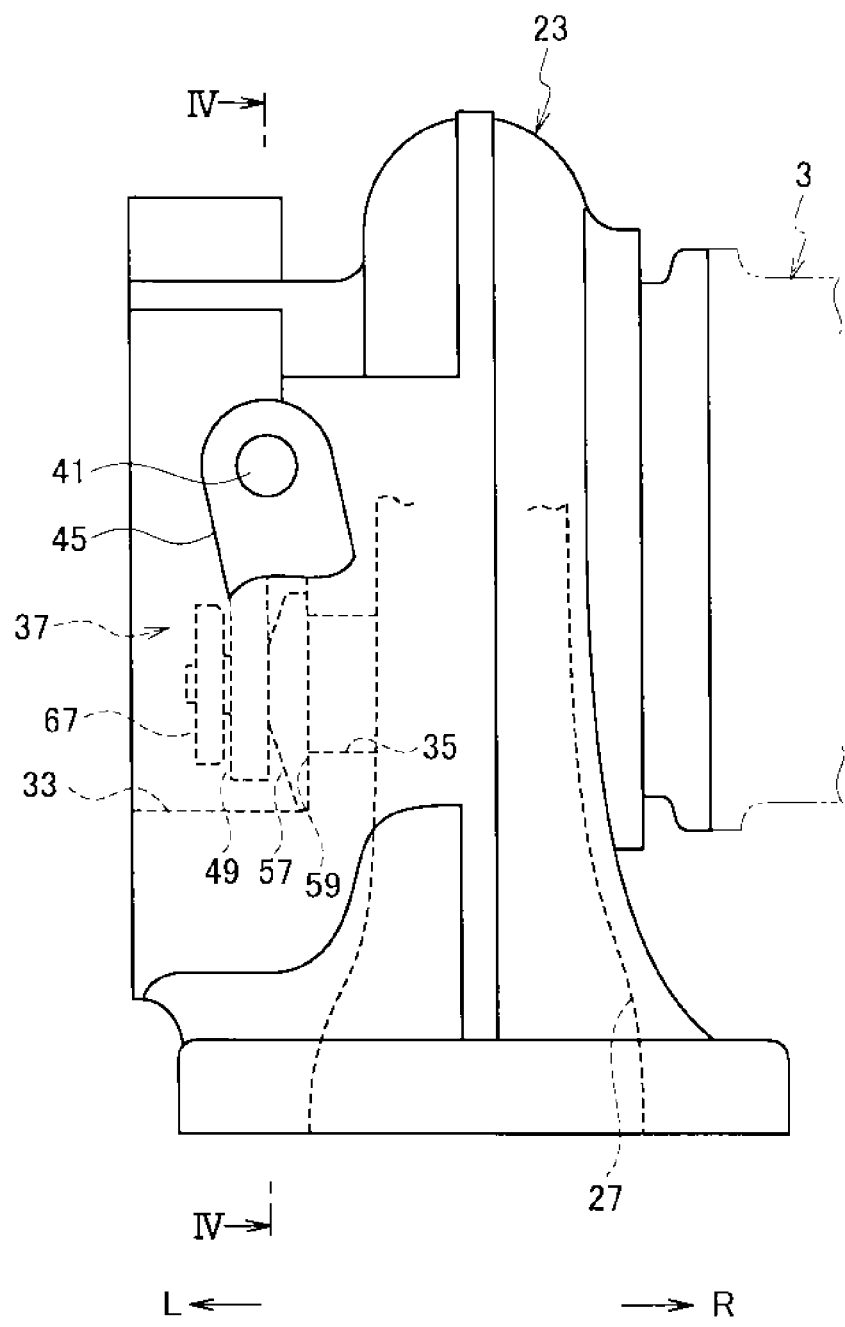
FIG. 5 is a front view of apart of a vehicular turbocharger according to the embodiment of the present disclosure.

As shown in FIGS. 4 to 6, a gas inlet (a gas introduction passage) 27 for introducing the exhaust gas is formed at an appropriate position of an outer wall of the turbine housing 23. The gas inlet 27 is connected to an exhaust manifold (illustration is omitted) of the engine. A turbine scroll flow passage 29 is formed on an entrance side (an upstream side in a flow direction of the exhaust gas) of the turbine wheel 25 inside the turbine housing 23. The turbine scroll flow passage 29 is formed in a spiral shape, and communicates with the gas inlet 27. A gas outlet (a gas discharge passage) 31 for discharging the exhaust gas is formed on an exit side (a downstream side in the flow direction of the exhaust gas) of the turbine wheel 25 in the turbine housing 23. The gas outlet 31 communicates with the turbine scroll flow passage 29. The other gas outlet (gas discharge passage) 33 for discharging the exhaust gas is formed outside in a radial direction of the gas outlet 31 in the turbine housing 23. The gas outlet 31 and the gas outlet 33 are connected to a catalyst (illustration is omitted) that purifies the exhaust gas via a connection pipe (illustration is omitted). Note that the gas outlet 31 and the gas outlet 33 correspond to exits of the turbine housing 23.

A bypass passage 35 as a gas-flow-rate variable passage is formed inside the turbine housing 23. The bypass passage 35 causes a part of the exhaust gas introduced from the gas inlet 27 to bypass the turbine wheel 25, and leads it out to the gas outlet 33 side. In other words, the bypass passage 35 adjusts a flow rate of the exhaust gas supplied to the turbine wheel 25 side. A waste gate valve 37 as a variable-flow-rate valve mechanism is provided at an appropriate position of the turbine housing 23. The waste gate valve 37 opens and closes an opening of the bypass passage 35.

A specific configuration of the waste gate valve 37 will be explained. As shown in FIGS. 2A, 2B, 2C, 3A, and 4, a support hole 39 is formed by penetrating through the outer wall of the turbine housing 23. A stem (a rotation shaft) 41 is rotatably supported by the support hole 39 via a bush 43. A base end (one end) of the stem 41 projects outside the turbine housing 23. In addition, a link member (a link plate) 45 is provided integrally with the base end of the stem 41 by fillet welding and the like. The link member 45 swings around an axial center of the stem 41 in normal and reverse directions by driving actuator 47. The actuator 47 has a well-known configuration incorporating a diaphragm (illustration is omitted) as shown in, for example, Japanese Patent Laid-Open Publication No. 10-103069, Japanese Patent Laid-Open Publication No. 2008-25442 and the like. When a pressure on the exit side of the compressor wheel 13 reaches a setting pressure, the actuator 47 swings the link member 45 in the normal direction (one direction). When the pressure on the exit side of the compressor wheel 13 becomes less than the setting pressure, the actuator 47 swings the link member 45 in the reverse direction (the other direction). Note that an electric actuator by electronic control or a hydraulic actuator by hydraulic pressure drive may be used as the actuator 47 instead of using an actuator incorporating a diaphragm.

An attachment member (an attachment plate) 49 is provided integrally with a tip (the other end) of the stem 41 by fillet welding etc. The attachment member 49 is located in the turbine housing 23. The attachment member 49 includes: an attachment sleeve 51 attached integrally with the stem 41; and an attachment tongue 53 provided integrally with the attachment sleeve 51. An attachment hole 55 in a width across flat shape is formed by penetrating through the attachment tongue 53.

A valve 57 is provided fitted in the attachment hole 55 of the attachment tongue 53 (the attachment member 49). The valve 57 is allowed to have backlash to the attachment member 49. The backlash includes inclination to a center line C of the attachment hole 55 of the attachment tongue 53. The valve 57 has a flat top surface 61*t*. Furthermore, the valve 57 includes: a valve body 61 that can abut against and separate from a valve seat 59 on the opening side of the bypass passage 35; and a valve shaft 63 formed integrally with a center of the valve body 61, and fitted in the attachment hole 55 of the attachment tongue 53. On a side closer to the stem 41 in the valve body 61 (a right side in FIGS. 2A, 2B), a cutout 65 is formed along a longitudinal direction of the stem 41. A cross section of a fitting portion of the valve shaft 63 (a portion fitted in the attachment hole 55 of the attachment tongue 53) has a shape including a width across flat corresponding to the attachment hole 55 of the attachment tongue 53. Backlash of the valve 57 to the attachment member 49 is allowed, and thereby followability (adhesion) of the valve body 61 to the valve seat 59 on the opening side of the bypass passage 35 is secured.

A metal washer 67 as an annular clasp is provided integrally with a tip of the valve shaft 63 by fillet welding, swaging, or the like. The metal washer 67 makes the valve 57 non-detachable from the attachment member 49. A chamfering 69 is formed at an outer peripheral edge of a back surface 67*b* of the metal washer 67.

Note that the attachment hole 55 of the attachment tongue 53 and a cross section of the fitting portion of the valve shaft 63 may be formed in a circular shape instead of the width across flat shape. In addition, the valve shaft 63 may be provided integrally with the center of the valve body 61 by swaging, or the like, and the metal washer (clasp) 67 may be formed integrally with the tip of the valve shaft 63, instead of the valve shaft 63 being formed integrally with the center of the valve body 61, and the metal washer (clasp) 67 being provided integrally with the tip of the valve shaft 63 by fillet welding, swaging, or the like.

Subsequently, a main configuration of the waste gate valve 37 of the embodiment of the present disclosure will be explained.

Figure 3A:
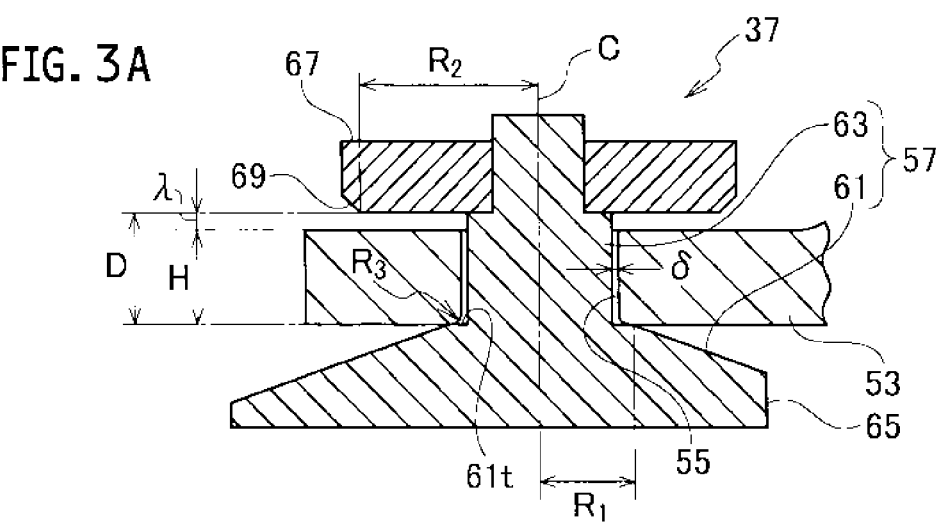
FIG. 3A is a partial cross-sectional view of the waste gate valve according to the embodiment of the present disclosure.

As shown in FIG. 3A, there is fitting clearance (hereinafter, referred to as clearance) δ between an inner peripheral surface of the attachment hole 55 of the attachment tongue 53 and an outer peripheral surface of the valve shaft 63. The clearance δ is set to be smaller than a value λ obtained by subtracting a depth dimension H of the attachment hole 55 of the attachment tongue 53 (a thickness dimension of the attachment tongue 53) from an interval dimension D between the top surface 61t of the valve body 61 and the back surface 67b of the metal washer 67. The value λ is, in other words, an allowable displacement amount in an axial direction of the valve 57 (a longitudinal direction of the valve shaft 63) with respect to the attachment tongue 53. In addition, in the embodiment, a ratio (λ/δ) of the value λ to the clearance δ is set to be 3.5 to 6.5. This is because when the ratio (λ/δ) is set to be less than 3.5, the backlash of the valve 57 to the attachment member 49 becomes excessively large, and it becomes difficult to reduce a chattering sound of the waste gate valve 37, and because when the ratio (λ/δ) is set to exceed 6.5, the backlash of the valve 57 to the attachment member 49 becomes excessively small, and it becomes difficult to sufficiently secure followability of the valve body 61 to the valve seat 59 on the opening side of the bypass passage 35.

Figure 3B:
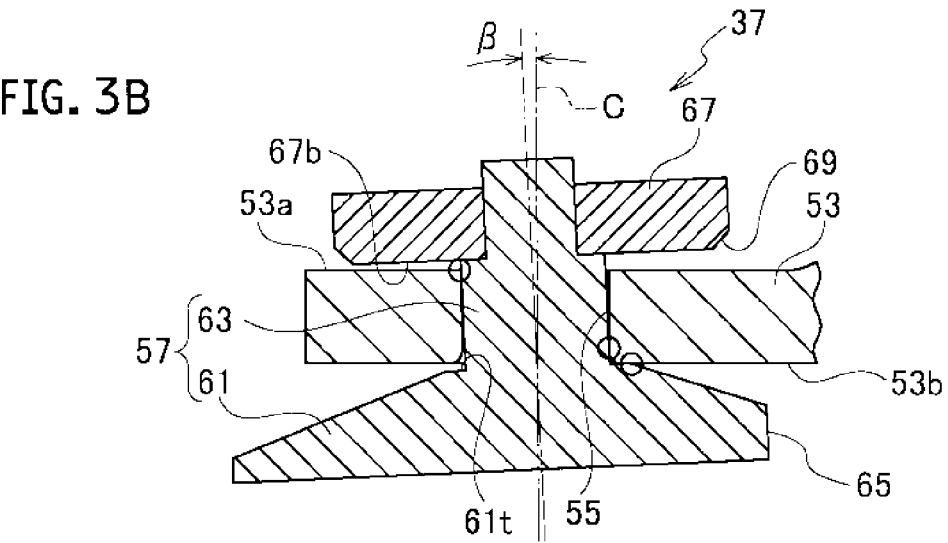
FIG. 3B is a partial cross-sectional view of the waste gate valve according to the embodiment of the present disclosure showing a state where a valve is inclined to a center line of an attachment hole of an attachment tongue.

As shown in FIGS. 3A and 3B, when a condition is satisfied in which the outer peripheral surface of the valve shaft 63 comes into contact with a front-side periphery and a back-side periphery of the attachment hole 55 of the attachment tongue 53, and in which the top surface 61t of the valve body 61 comes into contact with a back surface 53b of the attachment tongue 53, the waste gate valve 37 is constituted so that the metal washer 67 becomes non-contact with a front surface 53a of the attachment tongue 53.

Figure 3C:
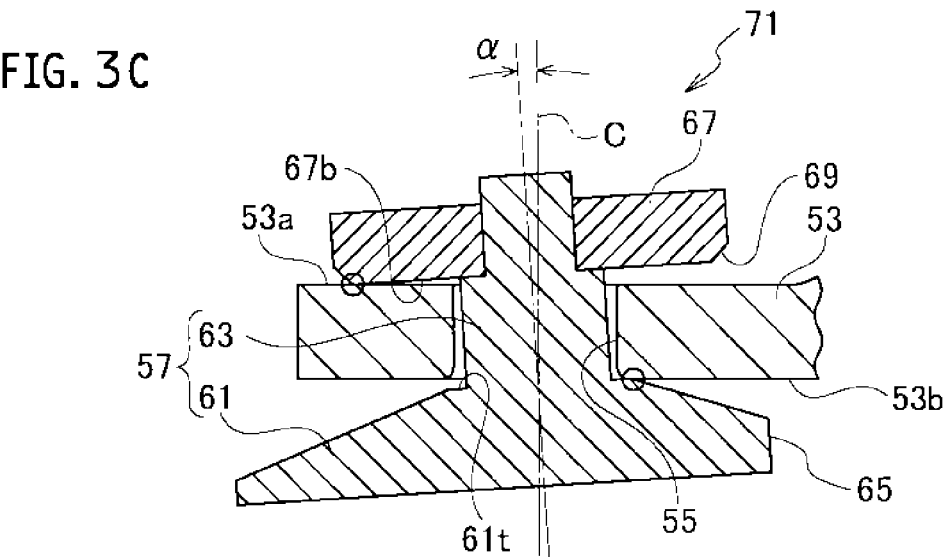
FIG. 3C is a partial cross-sectional view of a waste gate valve according to a comparative example showing a state where a valve is inclined to a center line of an attachment hole of an attachment tongue.

Specifically, for example, as shown in FIG. 3C, a case is assumed where the top surface 61t of the valve body 61 comes into contact with the back surface 53b of the attachment tongue 53, and where the metal washer 67 comes into contact with the front surface 53a of the attachment tongue 53. In this case, an inclination angle α of the valve 57 with respect to the center line C of the attachment hole 55 of the attachment tongue 53 is expressed as $\tan^{-1}\{\lambda/(R_1+R_2)\}$ from a geometrical relation. In addition, as shown in FIG. 3B, a case is assumed where the outer peripheral surface of the valve shaft 63 comes into contact with the front-side periphery and the back-side periphery of the attachment hole 55 of the attachment tongue 53, and where the top surface 61t of the valve body 61 comes into contact with the back surface 53b of the attachment tongue 53. In this case, an inclination angle β of the valve 57 with respect to the center line C of the attachment hole 55 of the attachment tongue 53 is expressed as $\tan^{-1}\{2\delta/(H-R_3)\}$ from a geometrical relation. Additionally, it is when the inclination angle β becomes smaller than the inclination angle α that the metal washer 67 becomes non-contact with the front surface 53a of the attachment tongue 53 when the condition is satisfied. In other words, it is when a next inequality holds that the metal washer 67 becomes non-contact with the front surface 53a of the attachment tongue 53.

$$\tan^{-1}\{\lambda/(R_1+R_2)\} > \tan^{-1}\{2\delta/(H-R_3)\} \quad \text{Formula (1)}$$

Here, $R_1$ denotes a radius of the top surface 61t of the valve body 61, $R_2$ denotes a radius of a portion excluding the chamfering 69 in the back surface 67b of the metal washer 67, and $R_3$ denotes a radius of curvature of the back-side periphery of the attachment hole 55 of the attachment tongue 53. Note that round marks of FIGS. 3B and 3C indicate the above-described contact portions.

Furthermore, when the clearance δ and the value λ are sufficiently small, Formula (1) can be replaced as the following Formula.

$$\lambda/(R_1+R_2) > 2\delta/(H-R_3) \quad \text{Formula (2)}$$

Note that FIG. 3C is a partial cross-sectional view of a waste gate valve 71 according to a comparative example, and that in FIG. 3C, the same portion numbers as corresponding components of the waste gate valve 37 are attached to components of the waste gate valve 71.

Subsequently, action and an effect of the embodiment will be explained.

Exhaust gas is introduced from the gas inlet 27, and circulates from the entrance side to the exit side of the turbine wheel 25 via the turbine scroll flow passage 29. By the circulation of the exhaust gas, the rotation force (rotation torque) is generated utilizing the pressure energy of the exhaust gas, and the rotor shaft 9 and the compressor wheel 13 can be rotated integrally with the turbine wheel 25. Accordingly, the air introduced from the air introduction port 15 can be compressed to be discharged from the air outlet 21 via the diffuser flow passage 17 and the compressor scroll flow passage 19, and thus the air supplied to the engine can be turbocharged (usual action of the turbocharger 1).

When a turbocharging pressure (a pressure on the exit side of the compressor wheel 13) reaches a setting pressure during operation of the turbocharger 1, the link member 45 swings in the normal direction (one direction) by driving the actuator 47, and the stem 41 rotates in the normal direction. By rotation of the stem 41 in the normal direction, the valve 57 swings in the normal direction, and the valve body 61 separates from the valve seat 59 on the opening side of the bypass passage 35. As a result, the opening of the bypass passage 35 is opened by the waste gate valve 37, a part of exhaust gas introduced from the gas inlet 27 bypasses the turbine wheel 25, and a flow rate of the exhaust gas supplied to the turbine wheel 25 side decreases.

In addition, when the turbocharging pressure becomes less than the setting pressure after the opening of the bypass passage 35 is opened, the link member 45 swings in the reverse direction (the other direction) by driving the actuator 47, and the stem 41 rotates in the reverse direction. By rotation of the stem 41 in the reverse direction, the valve 57 swings in the reverse direction, and the valve body 61 abuts against the valve seat 59 on the opening side of the bypass passage 35. As a result, the opening of the bypass passage 35 is closed by the waste gate valve 37, and the flow rate of the exhaust gas supplied to the turbine wheel 25 side increases (ordinary action of the waste gate valve 37).

The waste gate valve 37 is constituted so that the metal washer 67 becomes non-contact with the front surface 53a of the attachment tongue 53, when the clearance δ is set to be smaller than the value λ, and the condition is satisfied. Therefore, even though an outer diameter of the metal washer 67 is expanded by the increase in weight of the metal washer 67, contact of the top surface 61t of the valve body 61 with the back surface 53b of the attachment tongue 53 and contact of the metal washer 67 with the front surface 53a of the attachment tongue 53 do not occur simultaneously, when the valve 57 is inclined to the center line C of the attachment hole 55 of the attachment tongue 53 in a state where the opening of the bypass passage 35 is opened. In other words, the valve body 61 and the metal washer 67 do not come into contact with each other so as to sandwich the attachment tongue 53 in a state where the opening of the bypass passage 35 is opened. As a result, even though the weight of the metal washer 67 is increased, a large reaction force does not act from the attachment tongue 53 to the metal washer 67 in a state where the opening of the bypass passage 35 is opened. Particularly, since the chamfering 69 is formed at the outer peripheral edge of the back surface 67b of the metal washer 67, the weight of the metal washer 67 can be more increased while promoting the expansion of the outer diameter of the metal washer 67.

Furthermore, the cutout 65 is formed on the side closer to the stem 41 in the valve body 61 along the longitudinal direction of the stem 41. Therefore, even though backlash of the valve 57 to the attachment member 49 is small, the valve body 61 can be reliably caused to abut against the valve seat 59 on the opening side of the bypass passage 35 by swing of the valve 57 in the reverse direction. In other words, the opening of the bypass passage 35 can be reliably fully closed (full closing property of the opening can be enhanced) by the waste gate valve 37 (unique action of the waste gate valve 37).

Accordingly, according to the embodiment, even though the weight of the metal washer 67 is increased, the large reaction force does not act from the attachment tongue 53 to the metal washer 67 in a state where the opening of the bypass passage 35 is opened. Therefore, durability of the waste gate valve 37, namely, durability of the turbocharger 1 can be enhanced by sufficiently suppressing reduction of a combination force (a fastening force) of the tip of the valve shaft 63 and the metal washer 67 along with increase in the accumulated operation time of the turbocharger 1 while reducing the chattering sound from the waste gate valve 37 during operation of the turbocharger 1.

Moreover, reliability of the waste gate valve 37, namely, reliability of the turbocharger 1 can be enhanced since the full closing property of the opening of the bypass passage 35 can be enhanced by the waste gate valve 37 even though the backlash of the valve 57 to the attachment member 49 is small.

Note that the present disclosure is not limited to explanation of the above-described embodiment, and can be carried out in various aspects by making appropriate change such as providing a waste gate valve (illustration is omitted) that opens and closes an opening of a bypass passage (illustration is omitted) formed in an exhaust manifold (illustration is omitted), at an appropriate position of the exhaust manifold connected in a state of communicating with the gas inlet 27 of the turbine housing 23, or the like, instead of providing the waste gate valve 37 that opens and closes the bypass passage 35, at the appropriate position of the turbine housing 23.

Additionally, the scope of right encompassed in the present disclosure is not limited to the above-described embodiments. Namely, the variable-flow-rate valve mechanism of the present application is not limited to the above-described waste gate valve 37, and as shown in Japanese Utility Model Laid-Open No. 61-33923, Japanese Patent Laid-Open Publication No. 2001-263078, and the like, the variable-flow-rate valve mechanism can also be applied to a switching valve mechanism (illustration is omitted) that switches a supply state and a supply stop state of exhaust gas with respect to any of a plurality of turbine scroll flow passages (illustration is omitted) formed in a turbine housing (illustration is omitted). Furthermore, as shown in, for example, Japanese Patent Laid-Open Publication No. 2010-209688, Japanese Patent Laid-Open Publication No. 2011-106358, and the like, the variable-flow-rate valve mechanism of the present application can also be applied to a switching valve mechanism (illustration is omitted) that switches a supply state and a supply stop state of exhaust gas with respect to any of plural stages of turbine housings (illustration is omitted). Moreover, the variable-flow-rate valve mechanism of the present application can also be applied to both embodiments in which a flow rate of exhaust gas supplied to a turbine wheel side is decreased and increased by opening an opening of a bypass passage (a gas-flow-rate variable passage). Similarly, the variable-flow-rate valve mechanism of the present application can also be applied to both embodiments in which the flow rate of the exhaust gas supplied to the turbine wheel side is decreased and increased by closing the opening of the bypass passage (the gas-flow-rate variable passage).

What is claimed is:

1. A variable-flow-rate valve mechanism comprising:
   an attachment member provided with an attachment hole;
   a valve including a valve body and a valve shaft provided with the valve body, the valve shaft swingably provided in the attachment hole; and
   a clasp provided at a tip of the valve shaft, wherein
   a clearance between an inner peripheral surface of the attachment hole of the attachment member and an outer peripheral surface of the valve shaft is set to be smaller than a value obtained by subtracting a depth dimension of the attachment hole of the attachment member from an interval dimension between a top surface of the valve body and a back surface of the clasp,
   in a state where the outer peripheral surface of the valve shaft comes into contact with a front-side periphery and a back-side periphery of the attachment hole of the attachment member, and where the top surface of the valve body comes into contact with a back surface of the attachment member, the clasp is free of contact with a surface of the attachment member, and
   a ratio of the value obtained by subtracting the depth dimension of the attachment hole of the attachment member from the interval dimension between the top surface of the valve body and the back surface of the clasp to the clearance is set to be 3.5 to 6.5.

2. The variable-flow-rate valve mechanism according to claim 1, further comprising:
   a stem provided with the attachment member, wherein part of the valve body on a side closer to the stem is cut out along a longitudinal direction of the stem.

3. The variable-flow-rate valve mechanism according to claim 1, wherein a chamfering is formed at an outer peripheral edge of the back surface of the clasp.

4. A turbocharger that turbocharges air supplied to an engine by utilizing energy of exhaust gas from the engine, comprising the variable-flow-rate valve mechanism according to claim 1.

5. The variable-flow-rate valve mechanism according to claim 1, further comprising
   a stem provided with the attachment member, wherein the valve body includes a flat surface along a longitudinal direction of the stem on a side closer to the stem.

6. A variable-flow-rate valve mechanism comprising:
an attachment member provided with an attachment hole;
a valve including a valve body and a valve shaft provided with the valve body, the valve shaft swingably provided in the attachment hole;
a clasp for the valve, attached to the valve shaft on a position across the attachment member from the valve body, and
a clearance between an inner peripheral surface of the attachment hole of the attachment member and an outer peripheral surface of the valve shaft wherein
in a state where the valve is in contact with a front-side periphery of the attachment hole due to an inclination of the valve with respect to the attachment member, the clasp is free of contact with a surface of the attachment member, and
a ratio of the value obtained by subtracting a depth dimension of the attachment hole of the attachment member from an interval dimension between a top surface of the valve body and a back surface of the clasp to the clearance is set to be 3.5 to 6.5.

7. The variable-flow-rate valve mechanism according to claim 6, further comprising:
a stem provided with the attachment member, wherein part of the valve body on a side closer to the stem is cut out along a longitudinal direction of the stem.

8. The variable-flow-rate valve mechanism according to claim 6, wherein a chamfering is formed at an outer peripheral edge of the back surface of the clasp.

9. A turbocharger that turbocharges air supplied to an engine by utilizing energy of exhaust gas from the engine, comprising the variable-flow-rate valve mechanism according to claim 6.

10. A variable-flow-rate valve mechanism comprising:
an attachment member provided with an attachment hole;
a valve including a valve body and a valve shaft swingably provided in the attachment hole; and
a clasp for the valve, attached to the valve shaft on a position across the attachment member from the valve body; wherein
the valve satisfies a relationship: $\lambda > (R_1 + R_2) \tan(\beta)$, in which
$\lambda$ is a value obtained by subtracting a depth dimension of the attachment hole of the attachment member from an interval dimension between a top surface of the valve body and a back surface of the clasp,
$R_1$ is a radius of the top surface of the valve body,
$R_2$ is a radius of a portion of the back surface of the clasp, and
$\beta$ is an inclination angle of the valve with respect to a center line of the attachment hole.

11. The variable-flow-rate valve mechanism according to claim 10, further comprising:
a stem provided with the attachment member, wherein part of the valve body on a side closer to the stem is cut out along a longitudinal direction of the stem.

12. The variable-flow-rate valve mechanism according to claim 10, further comprising:
a clearance between an inner peripheral surface of the attachment hole of the attachment member and an outer peripheral surface of the valve shaft, wherein a ratio of the value obtained by subtracting the depth dimension of the attachment hole of the attachment member from the interval dimension between the top surface of the valve body and the back surface of the clasp to the clearance is set to be 3.5 to 6.5.

13. The variable-flow-rate valve mechanism according to claim 10, wherein a chamfering is formed at an outer peripheral edge of the back surface of the clasp.

14. A turbocharger that turbocharges air supplied to an engine by utilizing energy of exhaust gas from the engine, comprising the variable-flow-rate valve mechanism according to claim 10.

* * * * *